United States Patent
Fairbanks

(10) Patent No.: US 11,133,746 B1
(45) Date of Patent: Sep. 28, 2021

(54) BATTERY LIFE EXTENDER AND METHOD

(71) Applicant: Advanced Battery Power Sources, Banning, CA (US)

(72) Inventor: Ken Dawson Fairbanks, Aurora, IL (US)

(73) Assignee: SAEMSEN, Banning, CA (US)

( * ) Notice: Subject to any disclaimer, the term of this patent is extended or adjusted under 35 U.S.C. 154(b) by 0 days.

(21) Appl. No.: 17/109,124

(22) Filed: Dec. 1, 2020

Related U.S. Application Data

(60) Provisional application No. 62/991,915, filed on Mar. 19, 2020.

(51) Int. Cl.
*H02M 3/335* (2006.01)
*H02M 1/00* (2006.01)

(52) U.S. Cl.
CPC ... *H02M 3/33561* (2013.01); *H02M 3/33576* (2013.01); *H02M 1/007* (2021.05); *H02M 1/009* (2021.05)

(58) Field of Classification Search
CPC .... H02M 3/22; H02M 3/335; H02M 3/33507; H02M 2001/007; H02M 3/338; H02M 3/3385
See application file for complete search history.

(56) References Cited

U.S. PATENT DOCUMENTS

| | | | | |
|---|---|---|---|---|
| 3,764,930 A | * | 10/1973 | Bakken | ............... H03F 3/3098 330/263 |
| 2009/0268486 A1 | * | 10/2009 | Ljusev | ................. H03F 3/217 363/15 |
| 2010/0172159 A1 | * | 7/2010 | Kyono | ........... H02M 3/33507 363/21.17 |

* cited by examiner

*Primary Examiner* — Gary L Laxton
(74) *Attorney, Agent, or Firm* — Steven C. Stewart

(57) ABSTRACT

A method and system to increase life of a direct current (DC) battery that powers an electronic device is disclosed. In one embodiment the system includes a first stage to convert the DC from the battery to an alternating current (AC), and a second stage to covert the AC from the first stage to a regulated direct current.

15 Claims, 3 Drawing Sheets

US 11,133,746 B1

BATTERY LIFE EXTENDER AND METHOD

PRIORITY

This application claims the benefit of U.S. provisional patent No. 62/991,915, titled "Battery Life Extender and Method" filed Mar. 19, 2020, the contents of which are hereby incorporated by reference.

TECHNICAL FIELD

The claimed embodiment pertains generally to circuits for extending the life of a battery that delivers power to an electronic device.

BACKGROUND OF THE INVENTION

A battery life extender and method are disclosed. Electronic devices such as tools, appliances, computers, medical devices, communication, military equipment, and transport devices have been powered by batteries (electric storage source). Batteries can drain quickly under heavy use requiring recharging or replacement. There is a need for a device to extend the life of the battery during operation.

SUMMARY OF THE INVENTION

A system to extend life of a battery generating a direct current (DC) is provided. The device includes a first stage to convert the DC from the battery to an alternating current (AC). A second stage is provided to covert the AC from the first stage to a regulated direct current. By converting the direct current from the battery to a higher voltage alternating current and then back to a low voltage direct current battery efficiency, life and consistency of power output is improved when powering an electronic circuit or motor. The first stage to regulate direct current includes a bridge rectifier having an input coupled with the first stage output terminals and having a rectified output terminal and a reference terminal. A first shunt capacitor is coupled between the rectified output terminal and the reference terminal. The rectified output terminal is coupled via an inductor to a first terminal of a second shunt capacitor and a first terminal of a first primary stage of a transformer. A second terminal of the second shunt capacitor is coupled with the reference terminal. A second terminal of the first primary stage of the transformer is coupled to a driver output of a pulse width modulator (PWM). A first terminal of a second primary stage of the transformer is coupled via a first impedance to a FB (error amplifier) input of the PWM. The FB input is coupled via a first terminal of a shunt impedance to the second reference terminal. A second terminal of the shunt impedance is coupled with the reference terminal. The first terminal of a second primary stage of the transformer is coupled via a second impedance and one or more diodes and a third shunt capacitor to the reference terminal. The one or more diodes are coupled via a third impedance to a BP (High Side Driver Voltage Boost) input of the PWM. A third shunt capacitor is coupled with the reference terminal. Secondary terminals of the first primary stage of the transformer are coupled via a diode in parallel with a fifth impedance and a fifth capacitor to the second stage output terminals. Preferably a capacitor, a rectifier and an impedance are coupled in parallel between the second stage output terminals.

In another implementation a method for extending life of a battery generating a direct current (DC) is disclosed. The method includes converting with a first stage the DC from the battery to an alternating current (AC), and converting with a second stage the AC from the first stage to a regulated direct current. Preferably the method to covert the AC from the first stage to a regulated direct current includes rectifying with a bridge rectifier AC from the first stage to provide a rectified output and filtering the rectified output with a first shunt capacitor, an in-series inductor and a second shunt capacitor. The rectified output is applied to a first primary stage of a transformer, and the first primary stage of the transformer is driven with a pulse width modulator (PWM) driver output. A first terminal of a second primary stage of the transformer is coupled via a first impedance to an FB (error amplifier) input of the PWM that triggers the driver output to generate an output voltage when the FB input exceeds a predetermined reference voltage level. The first terminal of a second primary stage of the transformer is coupled via one or more diodes and a third impedance to a BP (High Side Driver Voltage Boost) input of the PWM. Secondary terminals of the first primary stage of the transformer are coupled to the second stage output terminals to provide regulated direct current. In one implementation the secondary terminals of the first primary stage of the transformer are coupled via a voltage rectifier in parallel with a fifth impedance and a fifth capacitor.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
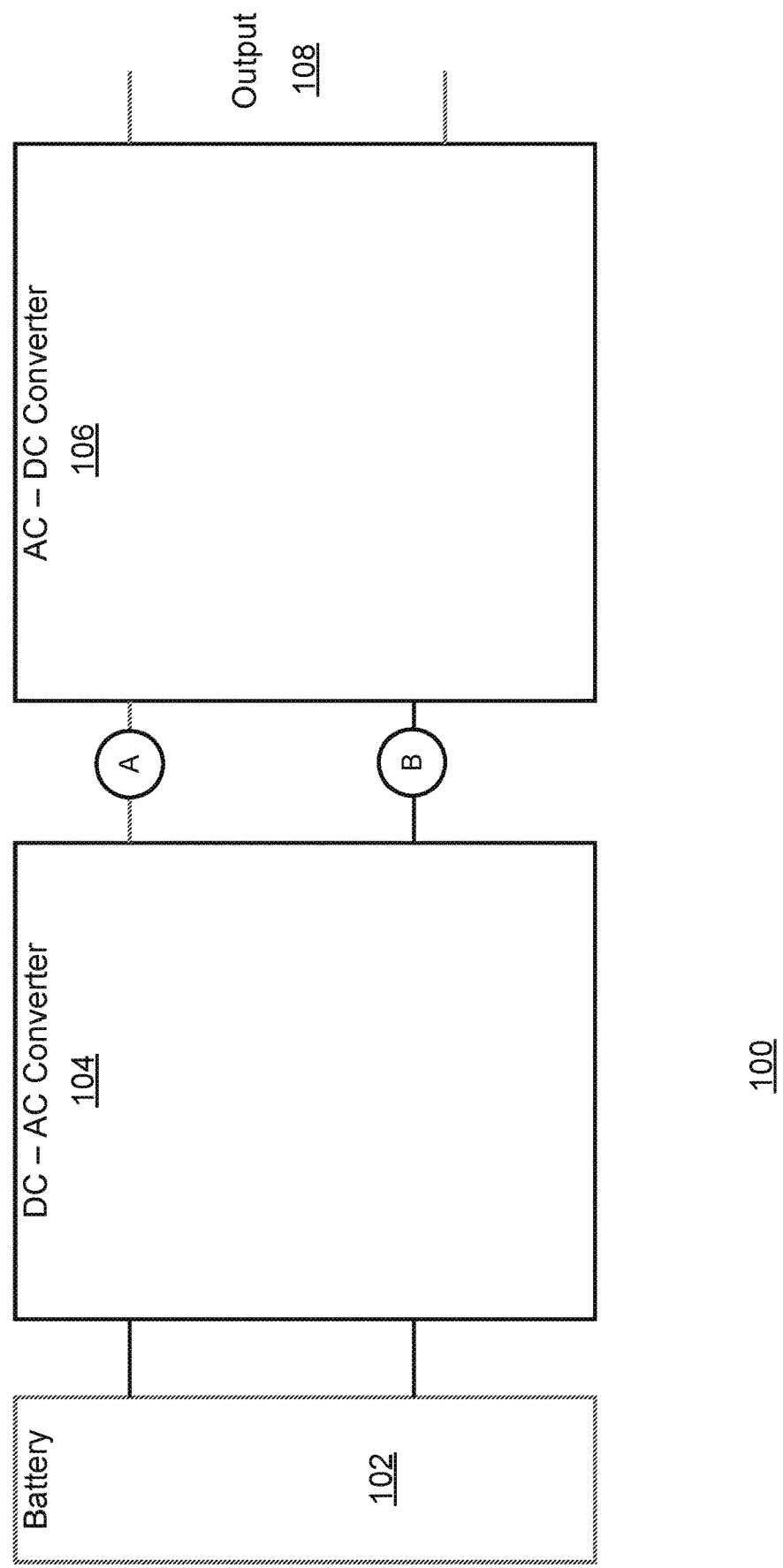
FIG. 1 is a simplified block diagram of a system for increasing battery life.

Referring to FIG. 1, there is shown a simplified block diagram of a system 100 for increasing battery life. System 100 includes a rechargeable battery 102 coupled via direct current (DC) to alternating current (AC) converter stage (first stage) 104 and AC-DC converter stage 106 (second stage) to output 108. Direct current (DC) to alternating current (AC) converter stage (first stage) 104 may be coupled to AC-DC converter stage 106 (second stage) via terminals A and B.

Figure 2:
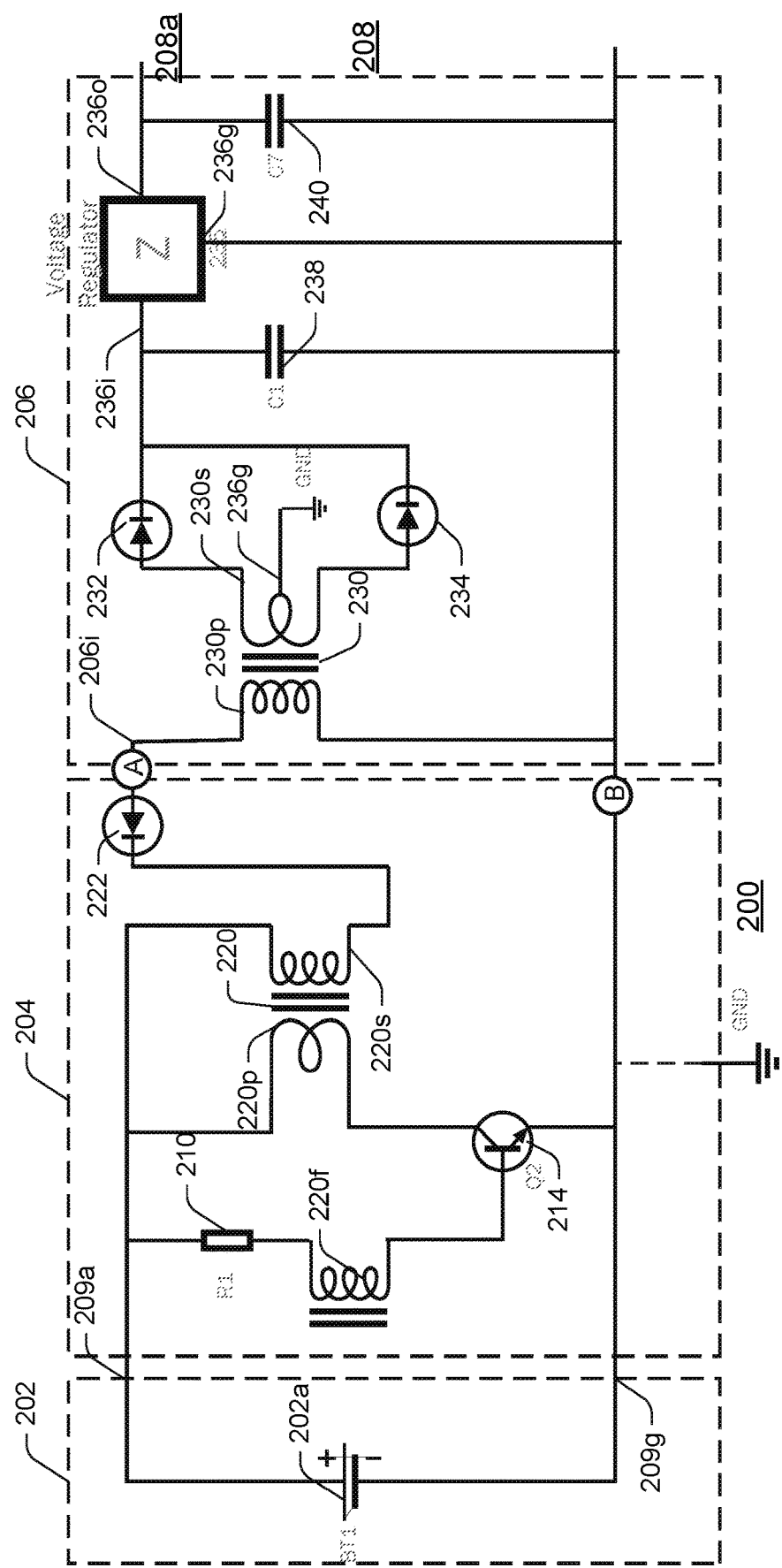
FIG. 2 is a detailed schematic diagram of the system shown in FIG. 1.

During operation, first stage 104 converts the DC from the battery to an alternating current (AC) and supplies the alternating current to second stage 106. Second stage 106 coverts the AC from the first stage 104 to a regulated direct current that is supplied to output 108. Any DC to AC converter may be used in the first stage 104, and any AC to DC converter may be used in the second stage 106. Exemplary first stage 104 and second stage 106 are shown in FIG. 2. Another exemplary DC to AC converter is Motorola model number SSW-2285US. The output from the second stage 106 may be fed to or used in any of the applications described herein.

Referring to FIG. 2, there is shown a detailed schematic diagram of a system 200 for increasing battery life. System 200 includes a battery stage 202 (battery stage 102 of FIG. 1) coupled via direct current (DC) to alternating current (AC) converter stage 204 (First stage 104 of FIG. 1) and AC-DC converter stage 206 (second stage 106 of FIG. 1)) to output 208.

Battery stage 202 includes battery 202a. Battery 202a may be any rechargeable type DC battery or series of rechargeable batteries including, but not limited to, Nickel Cadmium (NiCd), Nickel-Metal Hydride (NiMH), Lead Acid, Lithium Ion (Li-ion) Battery, or Lithium Ion Polymer (Li-ion polymer). The output of battery stage 202a is fed to first stage 202 via terminals 209a and 209g. Terminal 209g is also coupled to ground.

First stage 204 includes a resister 210 having one terminal coupled to terminal 209a and its second terminal coupled in series via a second (or feedback) winding 220f of a secondary of transformer 220 to a base of transistor 214. One terminal 220a of a primary winding 220p of transformer 220 is coupled to terminal 209a, and another terminal of a primary of winding 220p transformer 220 is coupled to a collector of transistor 214. An emitter of transistor 214 is coupled to ground. One terminal of a secondary winding 220s of transformer 220 is coupled to terminal 209a, and another terminal of secondary winding 220s of transformer 220 is coupled to a cathode of diode 222. The primary winding 220p of transformer 220 has fewer windings than the secondary winding 220s of transformer 220. The anode of diode 222 is couple to input terminal 206i of AC to DC converter stage 206 via terminals A and B.

Second stage 206 includes a transformer 230 with a primary winding 230p coupled to input terminal 206i and another terminal of primary winding 230p is coupled to ground. Terminals of secondary winding 230p are coupled via anodes of diodes 232 and 234 respectively to an input terminal 236i of voltage regulator 236 and one terminal of grounded capacitor 238. The primary winding 230p of transformer 230 has more windings than the secondary winding 230s of transformer 230. A ground terminal 230g of the secondary winding 230s is coupled to ground. The other terminal of capacitor 238 and a ground terminal of 236g voltage regulator 236 is coupled to ground. Once such voltage regulator 236 is industry standard model number 7805. The output terminal 236o of voltage regulator 236 is coupled to system output terminal 208a and one terminal of capacitor 240 which is shunt to ground.

During operation first stage 204 DC to AC converter acts as a blocking oscillator or pulsed oscillator to produce a high voltage on secondary winding 230p of transformer 230. The first stage effectively converts a DC supply voltage of battery 202 to a high voltage (e.g. 350) AC waveform which is rectified by high speed diode 222 and fed to input terminal 206i (output terminal 205i or terminal A). Voltage across primary winding 220p oscillates due to transistor 214 being turned off and on in response to fluctuation of current flowing across resister 210, feedback winding of transformer 220 to the base of transistor 214.

The high voltage on input terminal 206i, is then converted to a lower AC voltage using transformer 230, and then rectified using diodes 232 and 234, filtered using capacitor 238 before being fed to voltage regulator 236. Voltage regulator 236 with capacitor 240 provides a regulated steady state DC output to output terminal 208a.

Figure 3:
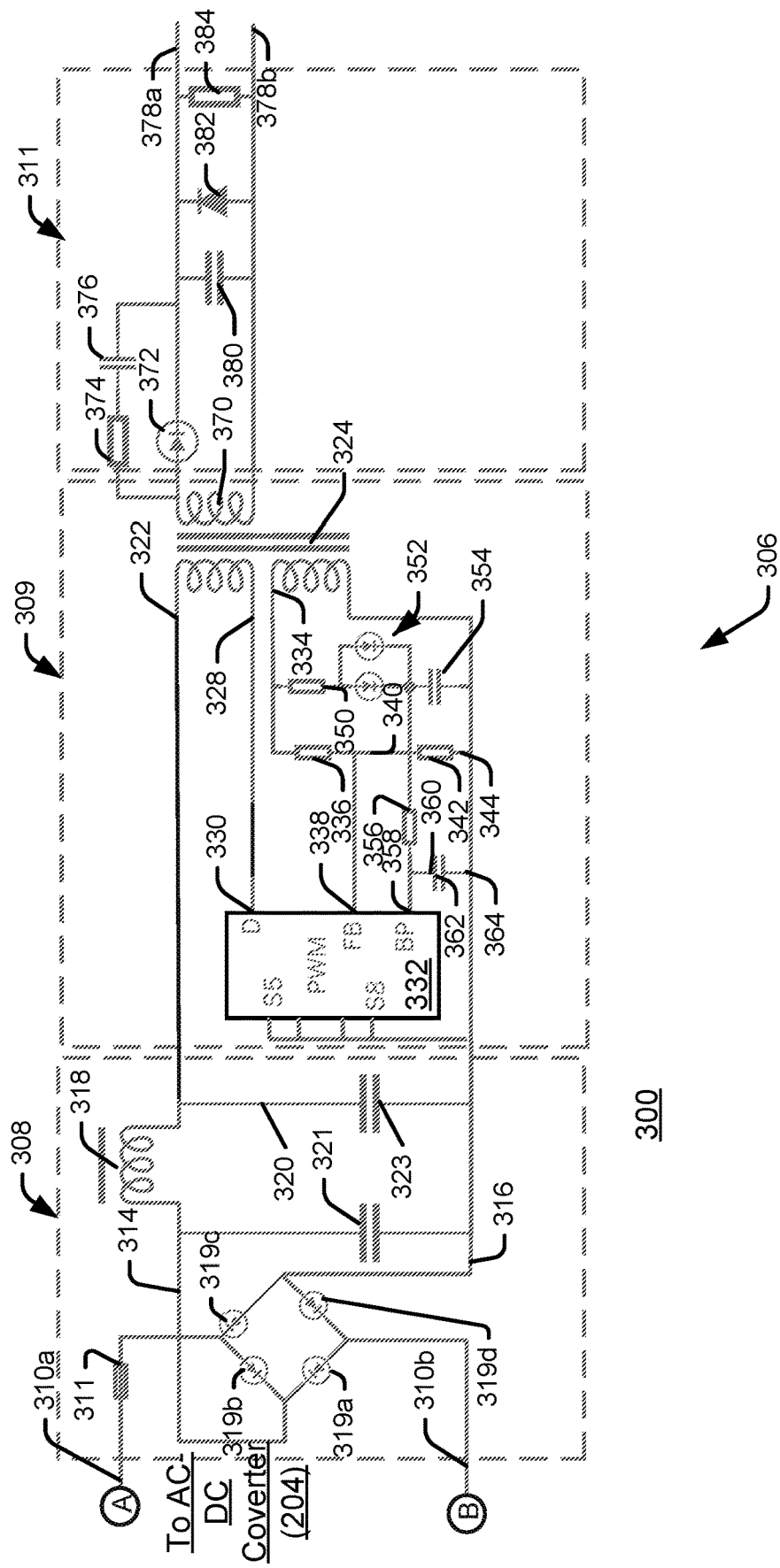
FIG. 3 is a detailed schematic of an alternate embodiment of the AC-DC converter shown in FIG. 2.

Referring to FIG. 3, there is shown a detailed schematic diagram of an alternate embodiment of second stage 300 (stage 206 shown in FIG. 2) for increasing battery life. Such second stage is coupled to first stage 204 at terminals A and B as shown in FIG. 2 and replaces stage 206. Second stage 300 includes an AC-DC converter stage 306 (second stage 106 of FIG. 1) to covert the AC from the first stage to a regulated direct current. Second stage 300 may replace stage 206 of FIG. 2.

The AC-DC converter stage 306 includes a Bridge rectifier 308 coupled via transformer stage 309 to filter/regulator stage 311. Bridge rectifier 308 rectifies the output of DC to AC circuit. Transformer stage 309 reduces the voltage level of the rectifier 308 output. Filter/regulator 311 removes the frequency components of transformer stage 309 output to provide a regulated DC output.

Bridge rectifier 308 has input terminals 310a-b coupled with the first stage output terminals (terminals 206i and 209g of FIG. 2). Bridge rectifier 308 is coupled to output terminal 206i via impedance 311. Bridge rectifier 308 has a rectified output terminal 314 and a reference terminal 316. Bridge rectifier 308 includes diodes 319a-d coupled in series, with the cathode of diode 319a coupled to the cathode of diode 319 b, the anode of diode 319c coupled to the anode of diode 319d, the cathode of diode 319c coupled to the anode of diode 319b, and the cathode of diode 319d coupled to the anode of diode 319a.

As part of the bridge rectifier, a first shunt capacitor 318 is coupled between the rectified output terminal 314 and the reference terminal 316. The rectified output terminal 314 is coupled to capacitor 321 and via an inductor 318 to a first terminal 320 of a second shunt capacitor 323 and a first terminal 322 of a first primary stage of a transformer 324. Second shunt capacitor 323 and shunt capacitor 321 are coupled (shunt) with the reference terminal 316 (ground). A second terminal 328 of the first primary stage of the transformer 324 is coupled to a driver output 330 of a pulse width modulator (PWM) 332, such as Part number SC1103 DG. On exemplary PWM is an Asynchronous Voltage Mode PWM model SC1103 by Semtech Corporation of Camarillo, Calif.

Transformer stage 309 includes transformer 324. A first terminal 334 of a second primary stage of the transformer 324 is coupled via a first impedance 336 to a FB (error amplifier) input terminal 338 of the PWM 334. The FB input terminal 338 is coupled via a first terminal 340 of a shunt impedance 342 to reference terminal 316. A second terminal 344 of the shunt impedance 342 is coupled with the reference terminal 316. The first terminal 334 of a second primary stage of the transformer 324 is coupled via a second impedance 350 to anodes of one or more diodes 352. The cathodes of diodes 352 are coupled via a shunt capacitor 354 to the reference terminal 316 and are coupled via a impedance 356 to a BP (High Side Driver Voltage Boost) input terminal 358 of the PWM 332 and terminal 360 of a shunt capacitor 362. Terminal 364 of third shunt capacitor 362 is coupled with the reference terminal 316. The other terminals of the PWM may be coupled to the reference terminal 316.

One output of Secondary terminal 370 of the first primary stage of the transformer 324 is coupled to an anode of a diode 372 in parallel with an impedance 374 connected in series with a capacitor 376. The cathode of diode 372 and capacitor 376 are coupled with a second stage output terminal 378a. Another output of secondary terminal 370 of the first primary stage of transformer 324 is coupled to second stage output terminal 378b. In one implementation, number of windings of the primary windings of the transformer 316 are greater than a number of windings of the secondary windings of the transformer 316.

Filter/regulator 311 includes a capacitor 380, a rectifier 382 and an impedance 384 that are coupled in parallel between the second stage output terminals 378a and 378b.

The output across terminal 378a-b provides a regulated steady state DC output current.

The system (system 100 of FIG. 1) has been shown to save power and is applicable to a host of applications in which a battery is used. Examples of applications in which system 100 may be used include:

Transportation devices by land, air, sea or space and all forms of power generation, power storage and power transmission and the extension thereof in all such domains to include the following: vehicles, cars, buses, trucks, airplanes, rockets, jet propulsion systems, helicopters, drones, UAV's, boats, ships, yachts, merchant shipping and military vessels, submarines, all submersibles, hyperloop machines, motorbikes, bicycles, hover boards, skate boards, jet packs, golf carts, quad bikes, fork lift trucks, all autonomous vehicles.

Machines including Magnetic machinery, magnetic levitation devices, robots, semi-autonomous vehicles, robot-taxis, all agricultural machinery, all earth moving equipment, all construction and mining equipment and machinery, drill rigs, tractors, caterpillar driven vehicles, combine harvesters, all gardening tools and equipment, chain saws, brush cutters, trimmers, lawn mowers, all DIY equipment, electric drills, work benches, mulching machinery, log splitters, trailers, pneumatic drills, all tunnel boring machinery, road repair and construction machinery, all elevators, lifts, pumps for transportation of liquid gas or air, and any filters of any kind that interface with a power supply. Engineering tools, all mechanical devices and machinery for horticultural and agricultural processes as well as in animal husbandry, veterinary systems, aquaculture, fish farming.

Computer equipment including, PC's, laptops, iPads, kindle readers, digital display units, burglar alarms, fire detection equipment, electrical systems management devices, electrical power supply and delivery management systems, any form of electrical metering systems for readout or information display and transmission system or screen, electrical and energy billing and computational device, all power generation devices, all power storage devices and the integration of any data system and or information system that links any communication device to any and all of the above or acts as a diagnostic tool to any and all of the above. Technology that is used to communicate and manage or transport information and electoral voting systems.

All household appliances and electrical goods including but not limited to the following HVAC's, air conditioning and heat transmission and or temperature control, cooling and heating devices, fans, refrigeration systems, geysers, vacuum cleaners, stoves, ovens, microwaves, kettles, toasters, waffle makers, blenders, food processors, bathroom equipment, showers, baths, water reticulation and heating systems, home entertainment systems, gaming consoles virtual reality devices, time management and recording devices, smoke, gas, chemical, biological and fire alarms, CCTV cameras, burglar alarms, electric fencing and perimeter security, access control system.

All material security systems both domestic, corporate, government, or military, all recreational devices including cameras, televisions, laptops, cell phones, or any device that emits and or communicates an electrical or radio frequency inter alia satellites, all means and tools of telephony RFID, asset tracking and navigation systems, All broadcasting systems including as land line, fiber optics, the internet, ADSL, broadband, WIFI devices, holographic, and holo-phonics.

All hydroelectric equipment, water purification and water treatment process and delivery mechanisms, both for irrigation, effluent treatment, desalination, environmental treatment, and conversion to potable standards, swimming pool equipment and filters and cleaning systems, All medical devices used for scanning, monitoring, diagnosing, analyzing, and operating on a patient and delivering medication and or self-medicating devices or any device that requires power in hospitals, ambulances, emergency services, clinics, and treatment centers.

All scientific measuring devices and laboratory equipment for measuring anything biological, chemical, physical, or in the quantum realm of physics that uses any power source to measure and quantify anything of a scientific or mathematical nature.

All forms of power generation and storage by way of solar, wind, biomass, wave propulsion, nuclear, coal, oil, gas, petroleum, laser, hydrogen, ethanol, biofuel, electromagnetic, chemical, atomic, kinetic, gyroscopic, fusion power, and any power generation system. Anything that has any power generation or power storage component that produces, transmits and or uses any computer or genomic appliance or algorithm specific to artificial intelligence, augmented intelligence, and or transhumanism, and that derives any benefit from any environmental source of power whether artificially manufactured or naturally occurring.

Any and all tools used by the emergency services, and civil organizations to deliver disaster relief services: fire, ambulance, medical, police, military and civil services to effect communication of mission critical data and equipment and services, all forms of LIDAR, mapping, navigational and surveying equipment and or systems, laser guided devices, spectrometers, radios, microscopes, targeting and target acquisition devices, weapons propulsion and delivery systems, PNG's (passive night goggles), DEW's (directional energy weapons), EMP's (electromagnetic pulse) devices, radar, early warning and detection systems, missile and weapons delivery systems, battlefield communication and transportation systems, and any tactical device used to transmit and capture data covertly.

Data warehousing and data collection devices, systems integration, IOT, cloud based systems, mainframe, all chip based electrical circuits and memory cards, all audio, audio-visual and recording devices and broadcasting and storage devices, cameras, personal communication and display units, and the delivery, transactional, auditing, identification and verification capabilities associated with any and all banking or financial services, advertising, social media, entertainment, sport, educational, recreational, online shopping, interactive chat system, crypto and/or blockchain system, biological data management and vaccine systems, track and trace systems. Transactional and all banking services includes all forms of payment systems by way of consideration for any goods, services, commissions or products rendered, exchanged and or bartered in recognition of and by way of receipt of and or exchange of any said commodities, products, assets and or services, as well as to include the recording and digital capturing of any said transaction legally and financially, in part or in whole by any and all entities legally acceptable to any government, individual, institution and or person or persons.

Data processing, data storage, data management and data transmission devices.

Medical devices including medical testing devices, medical alarm systems, access control systems, inventory management, industrial processing and or packaging.

GPS systems and travel management, passport verification, accommodation, booking and reservations systems, general record keeping, archiving, logistics and transportation systems.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. A device to extend life of a battery generating a direct current (DC) comprising:
   a first stage to convert the DC from the battery to an alternating current (AC); wherein the battery includes a positive and negative terminal, and wherein the first stage to convert the DC from the battery to the alternating current (AC) includes:
   a resistor having a first and second terminal, the first terminal coupled the positive terminal of the battery, and the second terminal coupled via a secondary stage of a transformer to a base of a transistor;
   a primary stage of the transformer having a first and second terminal, the first terminal of the primary stage coupled to the positive terminal and the second terminal of the primary coupled to a collector of the transistor, the emitter of the transistor coupled to the negative terminal; and
   the secondary stage of the transformer with a third and fourth terminal, the third terminal coupled to the positive terminal and the fourth terminal coupled via a diode to the second stage; and
   a second stage to convert the AC from the first stage to a regulated direct current.

2. The device as recited in claim 1, wherein said fourth terminal is coupled to a cathode of the diode, and wherein the first stage includes a first stage output terminal coupled with an anode of the diode to the second stage.

3. The device as recited in claim 1, wherein the second stage to convert the AC from the first stage to the regulated direct current includes:
   a bridge rectifier having an input coupled with the first stage output terminals and having a rectified output terminal and a reference terminal;
   a first shunt capacitor coupled between the rectified output terminal and the reference terminal, the rectified output terminal coupled via an inductor to a first terminal of a second shunt capacitor and a first terminal of a first primary stage of a transformer, a second terminal of the second shunt capacitor being coupled with the reference terminal;
   a second terminal of the first primary stage of the transformer coupled to a driver output of a pulse width modulator (PWM);
   a first terminal of a second primary stage of the transformer coupled via a first impedance to a FB (error amplifier) input of the PWM, wherein the FB input is coupled via a first terminal of a shunt impedance to the second reference terminal, and a second terminal of the shunt impedance being coupled with the reference terminal, the first terminal of a second primary stage of the transformer coupled via a second impedance and one or more diodes and a third shunt capacitor to the reference terminal, and the one or more diodes being coupled via a third impedance to a BP (High Side Driver Voltage Boost) input of the PWM and a third shunt capacitor coupled with the reference terminal; and
   secondary terminals of the first primary stage of the transformer coupled via a diode in parallel with a fifth impedance and a fifth capacitor to second stage output terminals.

4. A device to extend life of a battery generating a direct current (DC) comprising:
   a first stage to convert the DC from the battery to an alternating current (AC) via a transformer having a primary stage coupled with the battery and a secondary stage, wherein a number of turns of a winding of the secondary stage is greater than a number turns of a winding of the primary stage; and
   a second stage, coupled with the secondary stage, to convert the AC from the first stage to a regulated direct current, wherein the first stage has first stage output terminals in which AC is to be provided on at least one of the output terminals, and wherein the second stage to convert the AC from the first stage to the regulated direct current includes:
   a bridge rectifier having an input coupled with the first stage output terminals and having a rectified output terminal and a reference terminal;
   a first shunt capacitor coupled between the rectified output terminal and the reference terminal, the rectified output terminal coupled via an inductor to a first terminal of a second shunt capacitor and a first terminal of a first primary stage of a transformer, a second terminal of the second shunt capacitor being coupled with the reference terminal;
   a second terminal of the first primary stage of the transformer couple to a driver output of a pulse width modulator (PWM);
   a first terminal of a second primary stage of the transformer coupled via a first impedance to a FB (error amplifier) input of the PWM, wherein the FB input is coupled via a first terminal of a shunt impedance to the second reference terminal, and a second terminal of the shunt impedance being coupled with the reference terminal, the first terminal of a second primary stage of the transformer coupled via a second impedance and one or more diodes and a third shunt capacitor to the reference terminal, and the one or more diodes being coupled via a third impedance to a BP (High Side Driver Voltage Boost) input of the PWM and a third shunt capacitor coupled with the reference terminal; and
   secondary terminals of the first primary stage of the transformer coupled via a diode in parallel with a fifth impedance and a fifth capacitor to second stage output terminals.

5. The device as recited in claim 4, wherein the fifth capacitor, and the fifth impedance are coupled in parallel between the second stage output terminals.

6. The device as recited in claim 4, wherein the second stage, includes a second stage transformer having a primary winding coupled with the first stage and the second stage transformer having secondary winding, wherein a number of turns of the secondary winding of the second stage transformer is less than a number of turns of the primary winding of the second stage transformer.

7. A method for extending life of a battery generating a direct current (DC) comprising:

converting with a first stage the DC from the battery to an alternating current (AC); and converting with a second stage the AC from the first stage to a regulated direct current, wherein the battery has a positive terminal and a negative terminal, wherein converting with a first stage the DC from the battery to the alternating current (AC) comprises:

coupling a first terminal of a resistor with the positive terminal, and coupling a second terminal of the resistor via a secondary stage of a transformer to a base of a transistor;

coupling a first terminal of a primary stage of the transformer to the positive terminal and the second terminal of the primary stage of the transformer to a collector of the transistor;

coupling an emitter of the transistor the negative terminal; and coupling a third terminal of the secondary stage of the transformer to the positive terminal and coupling a fourth terminal of the secondary stage via a diode to the second stage.

8. A method for extending life of a battery generating a direct current (DC) comprising:

converting with a first stage the DC from the battery to an alternating current (AC) via a transformer having a secondary stage and a primary stage, wherein a number of turns of a winding of the secondary stage is greater than a number of turns of a winding of the primary stage; and converting with a second stage the AC from the first stage to a regulated direct current, wherein the first stage has first stage output terminals in which AC is to be provided on at least one of the output terminals, and wherein method to convert the AC from the first stage to the regulated direct current includes:

rectifying with a bridge rectifier AC from the first stage to provide a rectified output;

filtering the rectified output with a first shunt capacitor, an in-series inductor and a second shunt capacitor;

applying the rectified output to a first primary stage of a transformer;

driving the first primary stage of the transformer with a pulse width modulator (PWM) driver output;

coupling a first terminal of a second primary stage of the transformer via a first impedance to an FB (error amplifier) input of the PWM that triggers the driver output to generate an output voltage when the FB input exceeds a predetermined reference voltage level;

coupling the first terminal of a second primary stage of the transformer via one or more diodes and a third impedance to a BP (High Side Driver Voltage Boost) input of the PWM; and coupling secondary terminals of the first primary stage of the transformer to the second stage output terminals to provide regulated direct current.

9. The method of claim 8, wherein the second stage includes a second stage transformer having a primary winding coupled with the first stage and having a secondary winding, wherein a number of turns of the secondary winding of the second stage transformer is less than a number turns of the primary winding of the second stage transformer.

10. The method as recited in claim 8, further comprising coupling the secondary terminals of the first primary stage of the transformer via a voltage rectifier in parallel with a fifth impedance and a fifth capacitor.

11. A method for extending life of a battery generating a direct current (DC) comprising:

converting with a first stage the DC from the battery to an alternating current (AC); and converting with a second stage the AC from the first stage to a regulated direct current, wherein converting with a second stage the AC from the first stage to the regulated direct current includes converting with a second stage the AC from the first stage to a regulated direct current using a transformer having primary windings coupled with a bridge rectifier and an asynchronous voltage mode pulse width modulator controller, and generating the regulated direct current from a filtered output of the transformer's secondary windings.

12. A device to extend life of a battery generating a direct current (DC) comprising:

a first stage to convert the DC from the battery to an alternating current (AC), the battery including a positive and negative terminal, and wherein the first stage to convert the DC from the battery to an alternating current (AC) includes:

a resistor having a first and second terminal, the first terminal coupled the positive terminal of the battery, and the second terminal coupled via a secondary stage of a first transformer to a base of a transistor;

a primary stage of the transformer having a first and second terminal, the first terminal of the primary stage coupled to the positive terminal and the second terminal of the primary coupled to a collector of the transistor, the emitter of the transistor coupled to the negative terminal;

the secondary stage of the first transformer with a third and fourth terminal, the third terminal coupled to the positive terminal and the fourth terminal coupled via a diode to a first stage output terminal; and a second stage to convert the AC from the first stage to a regulated direct current, wherein the second stage includes:

a bridge rectifier having an input coupled with the first stage output terminal and the negative terminal, the bridge rectifier having a rectified output terminal and a reference terminal;

a first shunt capacitor coupled between the rectified output terminal and the reference terminal, the rectified output terminal coupled via an inductor to a first terminal of a second shunt capacitor and a first terminal of a first primary stage of a second transformer, a second terminal of the second shunt capacitor being coupled with the reference terminal;

a second terminal of the first primary stage of the transformer coupled to a driver output of a pulse width modulator (PWM);

a first terminal of a second primary stage of the second transformer coupled via a first impedance to an FB (error amplifier) input of the PWM, wherein the FB input is coupled via a first terminal of a shunt impedance to the second reference terminal, and a second terminal of the shunt impedance being coupled with the reference terminal, the first terminal of a second primary stage of the second transformer coupled via a second impedance, one or more diodes and a third shunt capacitor to the reference terminal, and the one or more diodes being coupled via a third impedance to a BP (High Side Driver Voltage Boost) input of the PWM and a third shunt capacitor coupled with the reference terminal; and secondary terminals of the first primary stage of the second transformer coupled via a diode in parallel with a fifth impedance in series with a fifth capacitor to second stage output terminals.

13. The device as recited in claim 12 wherein a sixth capacitor, a rectifier and a sixth impedance are coupled in parallel between the second stage output terminals.

14. The device as recited in claim 12 wherein a number of turns of a secondary winding of the first transformer are greater than a number of turns of a primary winding of the first transformer.

15. The device as recited in claim 12 wherein a number turns of a primary winding of the secondary transformer are greater than a number of turns of a secondary winding of the secondary transformer.

* * * * *